(12) United States Patent
Chiueh et al.

(10) Patent No.: US 8,880,784 B2
(45) Date of Patent: Nov. 4, 2014

(54) RANDOM WRITE OPTIMIZATION TECHNIQUES FOR FLASH DISKS

(75) Inventors: Tzi-cker Chiueh, Stony Brook, NY (US); Maohua Lu, Stony Brook, NY (US); Pi-Yuan Cheng, Hsin Chu (TW); Goutham Meruva, Stony Brook, NY (US)

(73) Assignee: Rether Networks Inc., Stony Brook, NY (US)

( * ) Notice: Subject to any disclaimer, the term of this patent is extended or adjusted under 35 U.S.C. 154(b) by 220 days.

(21) Appl. No.: 13/512,783

(22) PCT Filed: May 18, 2010

(86) PCT No.: PCT/US2010/035284
§ 371 (c)(1),
(2), (4) Date: May 30, 2012

(87) PCT Pub. No.: WO2011/090500
PCT Pub. Date: Jul. 28, 2011

(65) Prior Publication Data
US 2012/0239869 A1    Sep. 20, 2012

Related U.S. Application Data

(60) Provisional application No. 61/265,926, filed on Jan. 19, 2010.

(51) Int. Cl.
*G06F 12/00* (2006.01)
*G06F 12/02* (2006.01)

(52) U.S. Cl.
CPC .................................. *G06F 12/0246* (2013.01)
USPC ........... 711/103; 711/161; 711/162; 711/170; 711/205; 711/221

(58) Field of Classification Search
None
See application file for complete search history.

(56) References Cited

U.S. PATENT DOCUMENTS

| 2002/0116569 A1 | 8/2002 | Kim et al. |
| 2007/0266201 A1 | 11/2007 | Estakhri et al. |
| 2009/0063548 A1* | 3/2009 | Rusher et al. ................. 707/102 |
| 2009/0113121 A1 | 4/2009 | Lee et al. |

OTHER PUBLICATIONS

PCT/ISA/237 Written Opinion issued on PCT/US2010/035284 (pp. 4).
PCT/ISA/210 Search Report issued on PCT/US2010/035284 (pp. 5).

* cited by examiner

*Primary Examiner* — Shawn X Gu
(74) *Attorney, Agent, or Firm* — The Farrell Law Firm, P.C.

(57) ABSTRACT

Disclosed is a method for managing logical block write requests for a flash drive. The method includes receiving a logical block write request from a file system; assigning a category to the logical block; and generating at least three writes from the logical block write request, a first write writes the logical block to an Erasure Unit (EU) according to the category assigned to each logical block, a second write inserts a Block Mapping Table (BMT) update entry to a BMT update log, and a third write commits the BMT update entry to an on-disk BMT, wherein the first and second writes are performed synchronously and the third write is performed asynchronously and in a batched fashion.

15 Claims, 10 Drawing Sheets

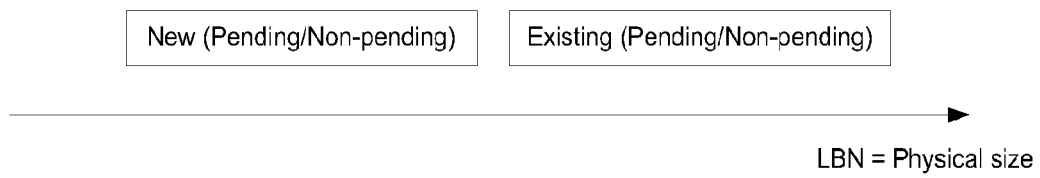
FIG. 3
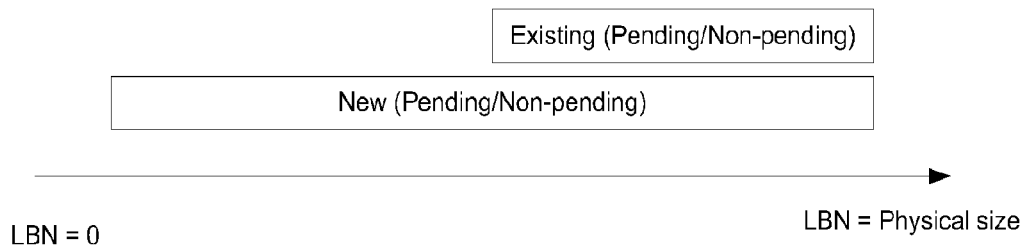
FIG. 4 ( a )
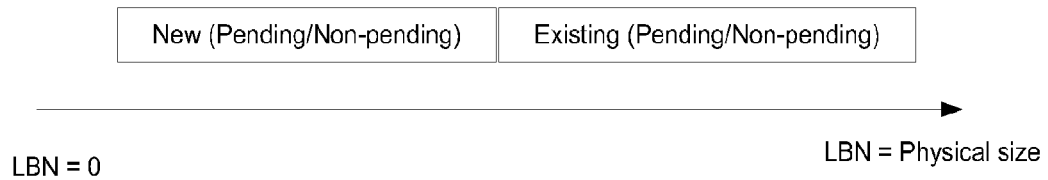
FIG. 4 ( b )

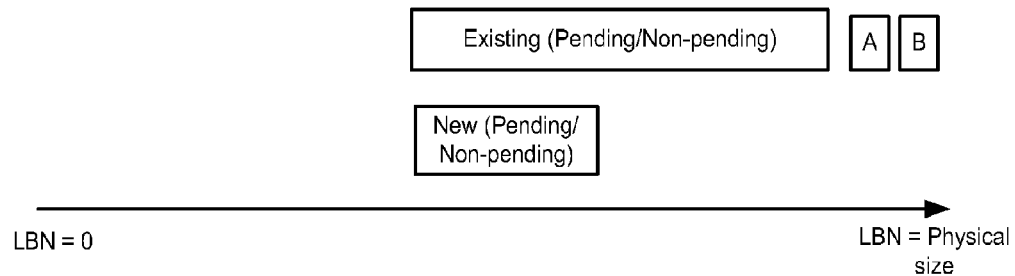
FIG. 8 ( a )
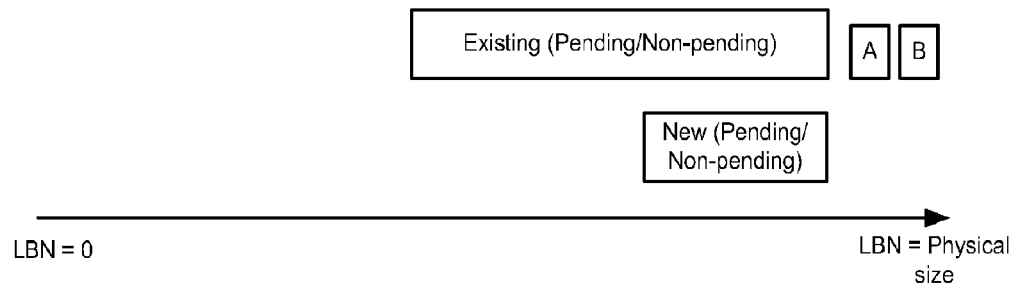
FIG. 8 ( b )
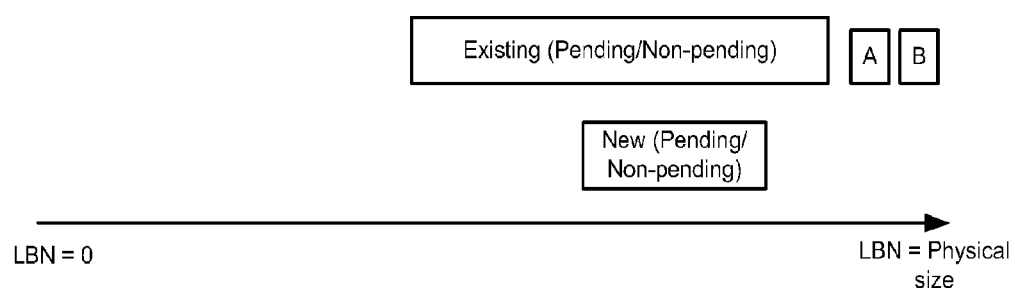
FIG. 8 ( c )

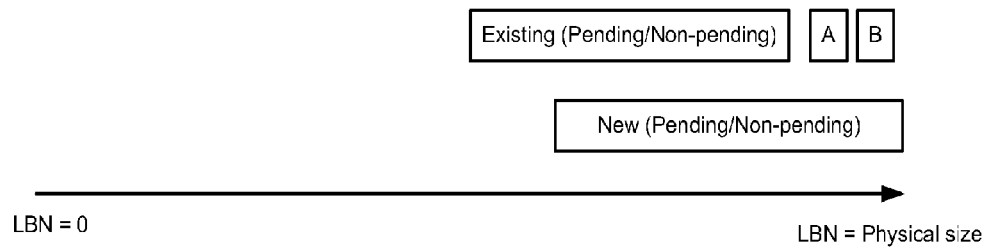
FIG. 9 ( a )
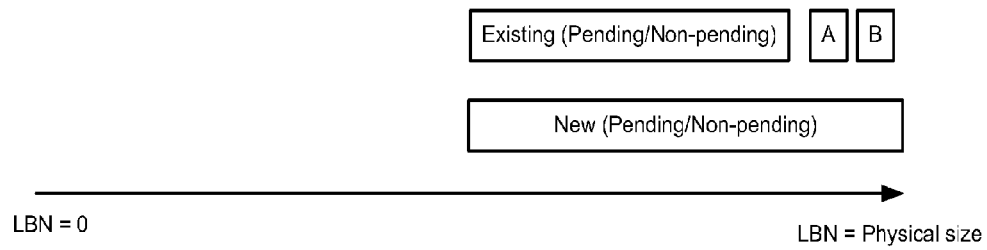
FIG. 9 ( b )
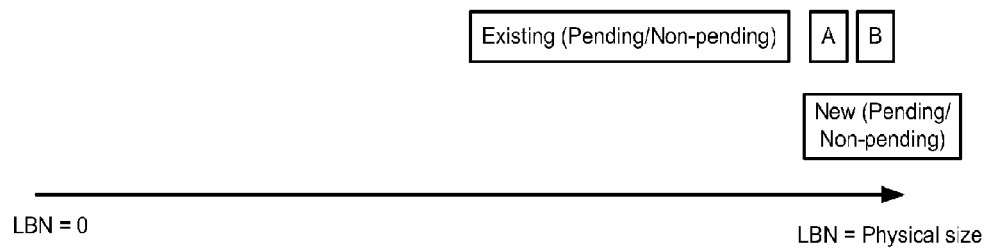
FIG. 10

RANDOM WRITE OPTIMIZATION TECHNIQUES FOR FLASH DISKS

PRIORITY

This application claims priority under 35 U.S.C. §119(e) to an application entitled "Log-structured Flash Storage Manager", which was filed in the United States Patent and Trademark Office on Dec. 2, 2009 and assigned Ser. No. 61/265,926, Jan. 19, 2010 the content of which is hereby incorporated by reference.

BACKGROUND OF THE INVENTION

1. Field of the Invention

The present invention relates generally to techniques for optimizing random writes for flash disks.

2. Description of the Related Art

The recent commoditization of Universal Serial Bus (USB)-based flash disks, mainly used in digital cameras, mobile music/video players and cell phones, has many pundits and technologists predicting that flash memory-based disks will become the mass storage of choice on mainstream laptop computers in two to three years. In fact, some of the ultra mobile Personal Computers (PCs) already use flash disks as the only mass storage device. Given the superior performance characteristics and enormous economies of scale behind the flash disk technology, it appears inevitable that flash disks will replace magnetic disks as the main persistent storage technology, at least in some classes of computers.

Compared to magnetic disks, flash disks consume less power, occupy less space, and are more reliable because they do not include any moving parts. Moreover, flash disks offer superior latency and throughput because they work similar to a Random Access Memory (RAM) chip and do not incur any head-positioning overhead. However, existing flash disk technology has two major drawbacks that render it largely a niche technology at this point.

First, flash disk technology is still quite expensive, as compared to magnetic disks.

Second, flash disk performance is better than a magnetic disk when the input workload consists of sequential reads, random reads, or sequential writes. Under a random write workload, flash disks performance is comparable to that of magnetic disk, at best, and in some cases actually worse. The flash disks random write performance problem is rooted in the way flash memory cells are modified, and thus cannot be easily addressed.

A flash memory chip is typically organized into a set of Erasure Units (EUs) (typically 256 Kbytes), each of which is the basic unit of erasure and in turn consists of a set of 512-byte sectors, which correspond to the basic units of read and write. After an EU is erased, subsequent writes to any of its sectors can proceed without triggering an erasure if their target addresses are disjoint. That is, after a sector is written to and before it can be written to a second time, the sector must be erased first. Because of this peculiar property of flash memory, random writes to a storage area mapped to an EU may trigger repeated copying of the storage area to a free EU and erasing of the original EU holding the storage area, resulting in significant performance overhead.

Flash disks are typically produced with a Flash Translation Layer (FTL), which is implemented in firmware. The FTL maps logical disk sectors, which are exposed to the software, to physical disk sectors, and performs various optimizations such as wear leveling, which equalizes the physical write frequency of the EUs. This logical-to-physical map requires 64 million entries in order to keep track of individual 512-byte sectors on a 32-GB flash disk. To reduce this map's memory requirement, flash disks increase the mapping granularity, sometimes to the level of an EU. As a result of this coarser mapping granularity, two temporally separate writes to the same mapping unit, e.g. an EU, will trigger a copy and erasure operation if the target address of the second write is not greater than that of the first write, because a flash disk cannot always tell whether a disk sector in an EU has already been previously written to. That is, if an Nth sector of a mapping unit is written to, any attempt to write to any sector whose sector number is less than or equal to N will require an erasure, even if the target sector itself has not been written to at all. Consequently, coarser mapping granularity further aggravates flash disks random write performance problem.

SUMMARY OF THE INVENTION

An aspect of the present invention is to address at least the above-mentioned problems and/or disadvantages and to provide at least the advantages described below.

Accordingly, an object of the present invention is to provide a Log-structured Flash Storage Manager (LFSM) apparatus and method that effectively solves at least the above-described problems.

According to the present invention, there is provided a method for managing logical block write requests for a flash drive, including receiving a logical block write request from a file system; assigning a category to the logical block; and generating at least three writes from the logical block write request, a first write writes the logical block to an Erasure Unit (EU) according to the category assigned to each logical block, a second write inserts a Block Mapping Table (BMT) update entry to a BMT update log, and a third write commits the BMT update entry to an on-disk BMT, wherein the first and second writes are performed synchronously and the third write is performed asynchronously and in a batched fashion.

BRIEF DESCRIPTION OF THE DRAWINGS

The above and other aspects, features and advantages of the present invention will be more apparent from the following detailed description taken in conjunction with the accompanying drawings, in which:

FIGS. 3-10 illustrate the various categories of insertion operations for inserting a new BMT entry into BMT Cache;

DETAILED DESCRIPTION OF THE PRESENT INVENTION

Hereinafter, embodiments of the present invention will be described in detail with reference to the accompanying drawings. In the following description of the present invention, a detailed description of known technologies incorporated herein will be omitted when it may obscure the subject matter of the present invention.

To address the random write performance problem of the prior art flash disks, a Log-structured Flash Storage Manager (LFSM) of the present invention converts all random writes into sequential writes to a set of unified logs by introducing an additional level of indirection above the Flash Translation Layer (FTL). Because all prior art flash disks have good sequential write performance, LFSM effectively solves the random write performance problems for these prior art flash disks in a uniform way without requiring any modifications to the prior art flash disk hardware implementations. With this novel log-structured storage organization, the LFSM overcomes two additional major challenges.

First, the LFSM still faces random writes because the LFSM maintains a separate map for the level of indirection or translation the LFSM introduces. Writes to this map are random. The LFSM minimizes the performance overhead of these random writes by using a technique referred to as Batching Updates with Sequential Commit (BUSC).

Second, to minimize the amount of copying required whenever the LFSM reclaims an EU, the LFSM allocates EUs to logical blocks in such a way that the logical blocks assigned to the same EU have a similar life time and each EU contains a stabilized utilization ratio, which means it is less likely that the utilization ratio will change in the future.

LFSM is a storage manager that is positioned between a file system and a flash disk's native driver. LFSM can be considered an auxiliary driver specifically designed to optimize the random write performance of existing flash disks in a disk-independent way. A property shared by all prior art flash disks is good sustained throughput for sequential writes, between 30-60 MB/sec. The LFSM converts random writes into sequential writes so as to eliminate random writes from the workload of the flash disk. To perform such conversion, the LFSM implements a linear disk address space exposed to the file system using multiple logs, and turns every incoming logical write into a physical write to the end of one of these logs which is mapped to different active EUs. Because writes to each log are sequential within an EU, their performance is the same as sequential write performance.

Figure 1:
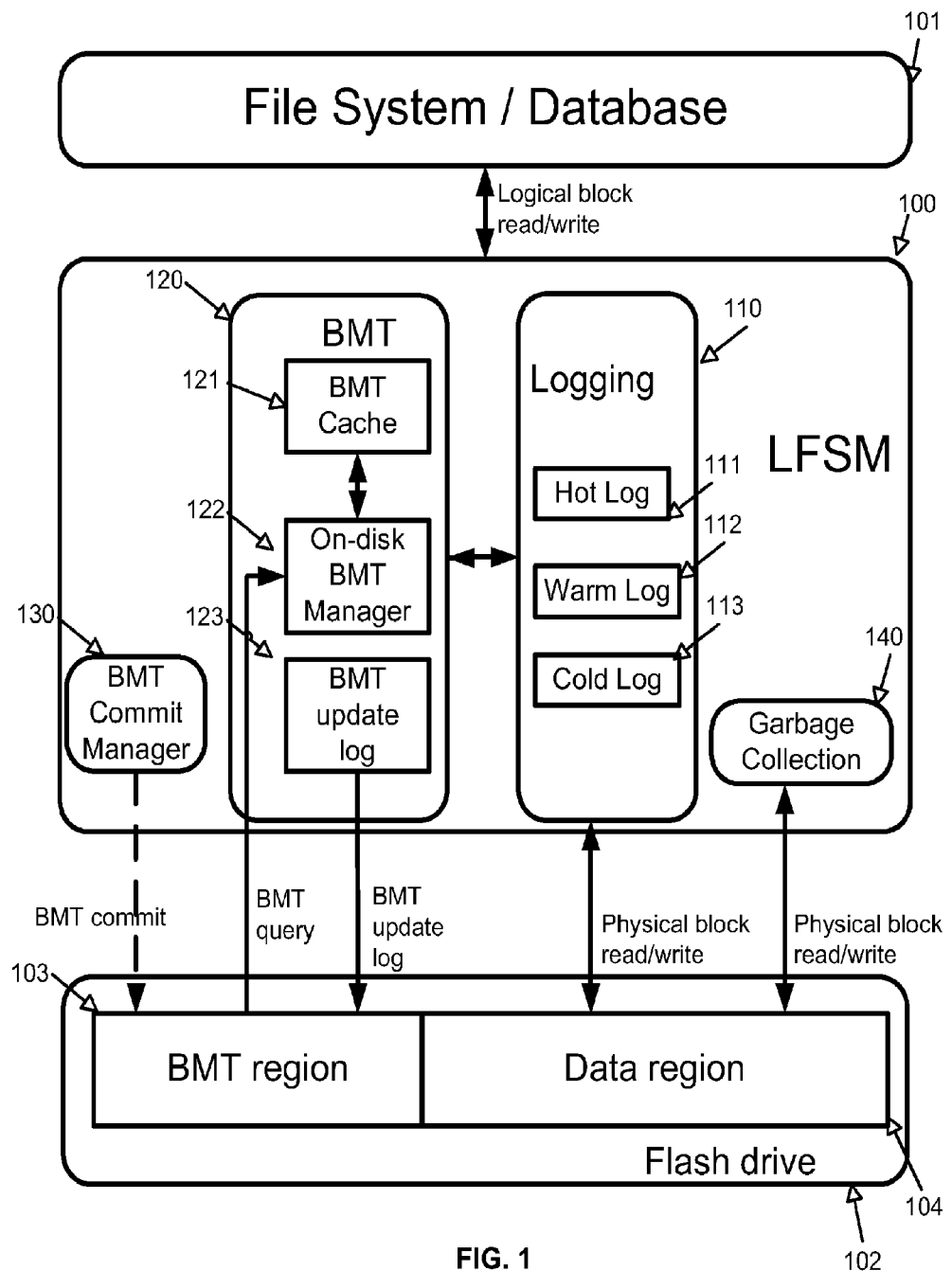
FIG. 1 is a diagram illustrating the construction of a Log-structured Flash Storage Manager (LFSM) according to an embodiment of the present invention.

FIG. 1 is a diagram illustrating the construction of an LFSM according to an embodiment of the present invention.

As shown in FIG. 1, LFSM 100 is positioned between file system/database 101 and flash drive 102. Accordingly, there are two address spaces in this design: the file system 101, and/or user applications, see a linear sequence of logical blocks exposed by LFSM 100, and the native flash disk 102 driver exposes a linear sequence of physical blocks to LFSM 100. The main data structures of the system are the BMT, the BMT update log and the data region. The main components of LFSM 100 are the synchronous logging module 110, the BMT update commit manager 130 and the garbage collection module 140. Flash drive 102 includes BMT region 103.

The LFSM consists of two threads. A main thread is responsible for synchronous flash disk logging, and another thread, a background thread, is responsible for asynchronous Block Mapping Table (BMT) commit and garbage collection. The main function of the logging module 110 is to handle the conversion of a random write to a sequential write. While receiving a random logical write request, the logging module 110 converts the random write request to a sequential write address in one of the three different "temperature" logs (e.g. a hot log 111, a warm log 112, and a cold log 113) or categories based on an amount of activity associated with the logical block. Although three logs are used as an example herein, any number of logs greater than two can be implemented. In addition, the use of the word "temperature" does not imply heat, but is used to describe the amount of activity associated with a particular block. The three different temperature logs store data blocks of different life time, which is defined as the time interval between two consecutive writes to a given block. As will be discussed further below, logging data blocks with a similar life time to the same EU increases the garbage collection performance.

A Log-structured File System (LFS) was one of the earliest works on organizing the entire file system as a log in order to mitigate the disk Input/Output (I/O) bottleneck problem of flash disks. The LFS maintains a single log of segments, and uses a product of segment age and segment utilization ratio as a metric to determine the order in which segments are reclaimed. In contrast, the LFSM advocates multiple logs, each of which is designed to hold data blocks with a distinct estimated life time range. The LFSM maintains a fixed-sized Least Recently Used (LRU) hot list (Hlist or hot_list), to move the least recently used log EU to the Least Valid Page (LVP) heap (LVP_heap). The LFSM sorts the EUs in LVP_heap according to their utilization ratio, which is defined as the percentage of an EU that contains live data blocks, and the root of the LVP_heap has the EU with the minimum utilization ratio. The LFSM chooses to reclaim the EU corresponding to the LVP_heap's root because it is stable and has the lowest utilization ratio, instead of reclaiming EUs only according to their utilization ratio (e.g. smallest first), as in the case of LFS.

As LFSM 100 converts a Logical Block Address (LBA) to a Physical Block Address (PBA), LFSM 100 needs to look up the BMT to perform this LBA to PBA conversion. The BMT is stored on disk. To mitigate the performance penalty due to disk I/O operations associated with BMT look-up, LFSM incorporates a BMT cache 121 that utilizes an interval-based data structure to cache the most recently used BMT records in the memory. A BMT update log 123 is a circular log to record the pending modified BMT entries, i.e. the BMT entries that have been modified and not yet committed to flash disk 102. As will be discussed in more detail below, LFSM 100 also uses the BMT update log 123 to reconstruct the pending BMT entries after a system crash.

The BMT commit manager 130 along with the on-disk BMT manager 122 manages the process of committing pending BMT records to an on-disk BMT region 103. To ensure that the BMT commit is a sequential process, LFSM 100 brings in an EU worth of BMT entries, commits pending updates to those BMT entries, and writes the modified BMT entries back to the same EU. After this, the BMT commit manager also retires the corresponding pending records in the BMT update log 123. The order in which BMT EUs are brought in is determined based on the following considerations: (a) the effective number of pending BMT updates committed and thus the space in per-page BMT update queues freed, and (b) the extent to which the global frontier in the BMT update log 123 is moved and thus the extent to which old entries in the BMT update log 123 are freed. When the free space in the BMT update log 123 runs low, there is a need to focus exclusively on consideration (b) to free up enough space in the BMT update log 123 to continue LFSM's normal operations. Consideration (a) is referred to as BMT popularity commit and consideration (b) is referred to as BMT critical commit.

To reclaim unused space on the logs, LFSM 100 performs garbage collection in the background, through the use of the garbage collection unit 140. The performance cost of reclaiming an EU is primarily linked to the copying out of the live physical blocks stored in the EU, and is thus proportional to the number of such blocks at the time of reclamation. To minimize the performance overhead associated with garbage collection, the LFSM garbage collection process selects for garbage collection the least utilized EU (i.e. an EU whose number of live blocks is the lowest).

Upon receipt of a write request associated with a LBA, LFSM 100 performs a BMT query to identify the temperature of the LBA. To accelerate the BMT look-up procedure, LFSM 100 utilizes the BMT cache 121. Based on the LBA's temperature, LFSM 100 logs the write request's payload to the corresponding EU, and updates the LBA's associated BMT entry with its new PBA. To prevent BMT corruption due to a crash, LFSM 100 puts this modified BMT record in an in-memory BMT update request queue, logs this modified BMT record to the BMT update log 123, and finally returns a write success hardware interrupt.

As mentioned above, the main thread is responsible for handling the synchronous flash disk logging. The synchronous flash disk logging is accomplished through the use of a process I/O request function (e.g. process_io_request). The process I/O request function is an I/O handler function registered to the kernel (e.g. a Linux kernel) by a blk_queue_make_request Application Programming Interface (API) with an I/O queue (i.e. disk→queue). While receiving the I/O request, the read/write handlers are called appropriately. The write I/O handler (e.g. i_write_bio) is defined in an I/O write file (e.g. io_write.c). The details of the I/O handler are described as follows:

Step 1. Get bio container and resolve the conflict I/O: a bio container is retrieved and I/O conflicts are resolved. The bio container is the basic data structure to hold the I/O request, which provides the information of the original bio (e.g. bio_container.org_bio), and a newly constructed sequential bio (e.g. bio_container.bio). Any conflicts of the write to the same physical address are properly handled by placing the requests in a wait queue.

Step 2. Init bio container: the bio container is initialized.

Step 3. Handle the unaligned I/O request: The I/O request unit (i.e. the page size PAGE_SIZE) of LFSM 100 is 4 kilobytes (KB). When the I/O request is not aligned to the 4 KB LFSM unit, the missing data is read out from the disk and copied to the sequential bio, which is referred to as a read-modify-write operation. The handling of the unaligned I/O requests checks the head and tail address of the bio for the unaligned I/O request, and performs read-modify-write to construct the buffer of the sequential bio. If the I/O is aligned, the buffer of the sequential bio is simply copied from the original bio.

Step 4. Get the destination sector: The target disk sector is obtained through a function, which generates the next physical, block number (e.g. get_dest_pbno). In this function, the temperature of the data is determined and the sequential destination address is returned.

Step 5. Issue the write request: The write I/O request for the sequential bio is issued to the hardware driver through a finish write function (e.g. finish write). Also, the BMT update entry has to be logged to the update log synchronously. This is to ensure safe recovery even if the system crashes while some BMT updates are not committed to disk.

The read I/O handler is similar to the write I/O handler and is well defined in an I/O read (e.g. io_read.c).

As also introduced above, the background thread is responsible for the asynchronous BMT commit and the garbage collection. The entry point for the background thread is handled by a background thread function (e.g. lfsm_bg_th-read). The garbage collection is handled by a garbage collection function (e.g. gc_collect_valid_blocks), and the BMT update commit is handled by a BMT commit manager function (e.g. BMT_commit_manager).

The logging module 110 of LFSM 100 converts a random logical LBA to a sequential PBA belonging to one of the active logs depending on the temperature of the LBA. The temperature logging idea eases the garbage collection overhead. LFSM 100 categorizes write data into multiple temperature levels (e.g. three temperature levels: hot, warm and cold). The cold data is expected to have the longest life time, warm data has a medium life time, and hot data has the shortest life time. Initially all LBAs are cold. After a LBA is written once, it becomes warm. If a warm LBA is written once again, it becomes hot, and continues to stay hot as it is written even more times. The temperature level of a LBA drops one level whenever it is copied out during a garbage collection operation as live data. A cold LBA continues to stay cold as it is overwritten even more times.

All EUs are categorized into three different groups in LFSM 100. The three groups are free, recently used, and ones whose utilization ratios stabilize. LFSM 100 links all free EUs in a linked list (e.g. HListGC.free_list). Active EUs are picked from the free list. When one active EU becomes full, the full EU is moved to a garbage collection heap called LVP_Heap (e.g. HListGC.LVP_Heap), expecting that this EU would be stable, by default. If an LBA within an EU (which is in LVP_Heap) is invalidated (over-written), it implies that the EU utilization is not yet stabilized. This EU is moved to a hot list (e.g. HListGC.hot_list). The EUs in the hot list might have different utilization ratios as time passes. If the hot list is full, the least recently used EU in the hot list will be moved to the LVP_Heap. The EUs in the garbage collection heap are considered to have stabilized utilization ratios.

Figure 2:
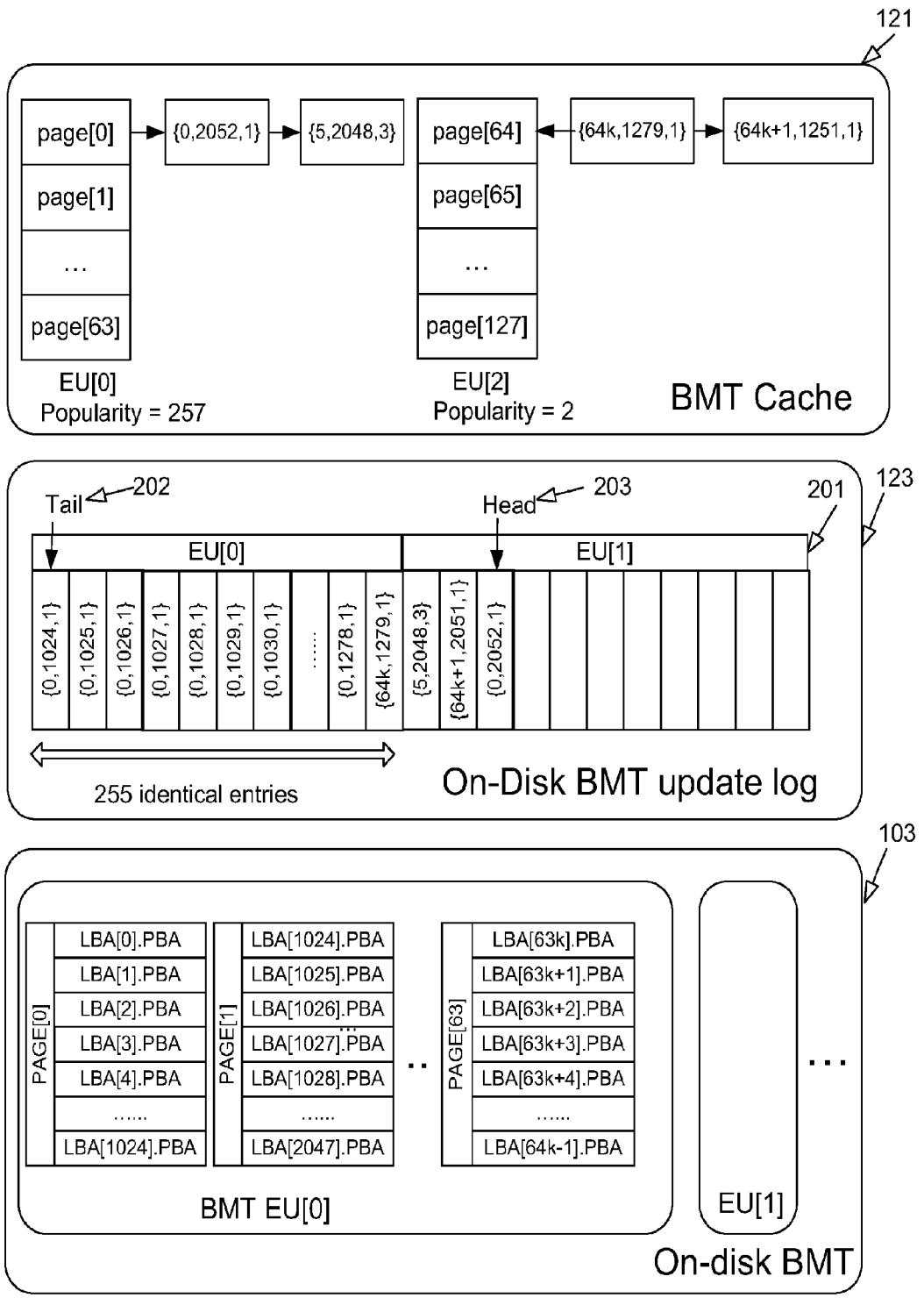
FIG. 2 is a diagram illustrating a Block Mapping Table (BMT) cache, an on-disk BMT update log, and an on-disk BMT of the LFSM according to an embodiment of the present invention.

FIG. 2 is a diagram illustrating the BMT cache, the on-disk BMT update log and the on-disk BMT of the LFSM according to an embodiment of the present invention.

The BMT module 120 maps an LBA to a PBA. As show in FIG. 2, the BMT module 120 is divided into three subsystems, the on-disk BMT manager 122, the BMT cache 121 and the BMT update log 123. LFSM 100 manages the on-disk BMT 103 as an array indexed by LBA and stored on disk. FIG. 2 illustrates an example where one BMT EU can store up to 64K BMT records. On-disk BMT look-up can be simply served by a disk read I/O with an LBA offset.

When a write request with a target LBA triggers a BMT update, this BMT update is inserted into an in-memory queue associated with the disk block that contains the LBA's BMT entry. This queue is referred to as a per-page BMT update queue, which also doubles as the BMT cache. The BMT lookup process is defined in a BMT lookup function (e.g. bmt_lookup). The BMT lookup function queries the BMT cache 121 using a per-page queue BMT cache lookup function (e.g. PPQ_BMT_cache_lookup), and if the target BMT record is not in the BMT cache, a read to on-disk BMT function (e.g. read_small_disk_io_temp) is called to obtain the target BMT entry from the on-disk BMT 122 and a per-page queue BMT cache insert function (e.g. PPQ_BMT_cache_insert_nonpending) is called to insert the BMT entries read from disk into the BMT cache 121.

The BMT cache 121 mitigates the disk I/O performance overhead associated with the BMT look-up procedure. The BMT cache 121 is arranged in a per-BMT-page structure as shown in FIG. 2. The data in the BMT cache 121 can be categorized as pending BMT entries and non-pending BMT entries. The pending BMT entries represent the BMT entries that have yet to be committed to the on-disk BMT 122, while the non-pending BMT entries have been committed to the on-disk BMT 122. When the logging module 110 logs a new pending BMT record to the BMT update log, LFSM 100 also updates the BMT cache 121 for the same entry. This was previously referred to as the synchronous write steps. During the BMT lookup processes, if the access to the BMT cache is a miss, the on-disk BMT manager 122 performs a BMT query by fetching one sector worth of BMT entries that contain the target BMT entry. All of the BMT records in this sector will be added to the BMT cache 121. When the BMT cache 121 is full, LFSM 100 ejects non-pending BMT entries in the least recently used BMT EU. Although the interval-based BMT cache saves memory space by aggregating the adjacent BMT entries, the interval-based BMT cache also introduces additional complexity to merge and split the BMT entries. While inserting a BMT entry into the BMT cache 121, the BMT entry must be merged with the adjacent entries if they have contiguous PBAs. While ejecting or updating the BMT entry, one BMT entry may need to be split apart into different intervals.

Although LFSM 100 has converted random LBA writes into consecutive PBA writes, the BMT commit manager 130 has to randomly write BMT entries to the LBA. LFSM 100 solves this problem by using the BUSC scheme to synchronously log the BMT update and asynchronously commit multiple updates to the BMT in a batched fashion. Because of the existence of the on-disk BMT update log 123, even if the system crashes, the BMT updates that have not been flushed to the on-disk BMT 103 can be correctly reconstructed at recovery time. The BMT commit manager 130 asynchronously commits the BMT pending records through aggregated and sequential writes to reduce the performance overhead of the random writes to the BMT 120.

Using BUSC to update the BMT 120 means that each logical block write operation triggers three related write operations. The first write operation writes a new version of the logical block to an EU according to the logical block's temperature; the second write operation logs the associated BMT update to the BMT update log; and, the third write operation actually updates the corresponding on-disk BMT entry. The first two writes are done synchronously and the third write is done asynchronously and in a batched fashion.

The BMT update commit manager 130 ensures that uncommitted BMT updates can be correctly recovered when the system crashes, and thus makes it possible to commit pending BMT updates in an efficient manner without compromising the integrity of the BMT 120.

The on-disk BMT update log 123 is a circular sequence of EUs 201, with two pointers, i.e. a tail pointer 202 and a head pointer 203. The logging module 110 writes the pending BMT records to the BMT update log 123 and moves the head pointer 203 to the next free write sector. After the BMT commit manager 130 commits a pending BMT update to the on-disk BMT 103, it will release the corresponding BMT record in the BMT update log 123 by freeing the space it occupies. The space in the BMT update log is reclaimed on an EU by EU basis. If all of the BMT records in the EU pointed to by the tail pointer 202 EU are released, the tail pointer 202 is moved toward the next adjacent EU. The size of the BMT update log 123 defines the maximum number of pending BMT update records in LFSM 100. When the BMT update log 123 is full, which means the head pointer 203 and tail pointer 202 have overlapped due to the circular nature of the logging process, the incoming write remains pending until the BMT commit manager 130 can move ahead the tail pointer 202 EU. The BMT update log entry is designed as an aggregated BMT entry (e.g. A_BMT_E) structure. The advantage of using an interval-based representation for BMT update log entries is because if LFSM 100 receives a write request that spans more than one sector, only one BMT update log entry is needed by properly setting the run length field (e.g. run_length).

When a machine crashes, LFSM 100 can recover uncommitted data. LFSM 100 scans through the BMT update log 123 and reconstructs the pending BMT entries according to the sequence number in the BMT update log entries. To facilitate the identification of not-yet-committed BMT updates, LFSM 100 includes the following information in the BMT update log entry associated with each logical block write operation: (1) LBA, PBA, and run length; (2) a unique sequence number assigned to each write request; and (3) a commit point. The commit point refers to the sequence number of the youngest logical block write request of all the BMT updates before which have already been committed to disk. That is, the commit point indicates where the backward traversal of the BMT update log 123 can stop during the crash recovery process. With this information, LFSM 100 reconstructs pending BMT updates by first identifying the latest or youngest BMT log entry (whose sequence number is N1), then obtaining its associated commit point (whose sequence number is N2), and finally reading in all the BMT update log entries between N1 and N2 to insert them into their corresponding per-page BMT update queues.

The logging of the BMT updates creates a space overhead problem. Because the minimum unit for reading and writing a flash disk is a 512-byte sector, each BMT update log entry requires a 512-byte sector even though in actuality it may only require 22 bytes. Thus, the space overhead associated with BMT logging is about 12.5% (512 bytes for every 4-KB page), which is too high to be acceptable. LFSM 100 sitting above to the firmware level cannot utilize the out-of-band area of each block. To minimize the performance overhead, LFSM 100 preserves 10 Mb of disk space dedicated for the BMT update log 123 on a 64 GB disk. The BMT update log disk space can store up to 20K BMT update log entries. A BMT update log function (e.g. BMT_update_log_init) is a BMT update log commit function (e.g. bmt_update_log.c) handles the configuration of the BMT update log 123.

With the above design, LFSM 100 successfully services each logical block write operation using one sequential write to the BMT update log 123 and another sequential write to the active EU, and thus greatly improves the random write performance of modern flash disks. However, the BMT update log 123 introduces an additional disk write penalty. One way to solve the additional disk write penalty is to put the BMT update log 123 and active EUs onto different disks so as to perform write operations to them in parallel.

The BMT cache 121 is used to improve the performance of the BMT look up process. The BMT cache 121 is embedded in the per page BMT update queues, and consists of non-pending entries (clean) and pending entries (dirty) that form a sorted linked list. In order to save memory space, consecutive BMT entries in the same per-page queue with consecutive Logical Block Number (LBN or lbno) and Physical Block Number (PBN or pbno) can be merged together as an aggregated BMT entry (i.e. A_BMT_E). For example, BMT{LBN:100,PBN:200} and BMT{LBN:101,PBN:201} can be merged as BMT{LBN:100,PBN:200,runlength:2}. During normal operations, a BMT look up into per-page queues requires O(n) complexity and an insert of an entry into per-page queues also requires O(n) complexity, where n is the average length of each per-page queue.

A threshold (e.g. PPQ_CACHE_T_HIGH) is set for a maximum number of non-pending entries that can exist in the BMT cache 121. The background thread is responsible for detecting when the total number of non-pending BMT cache entries (i.e. BMT.total_non_pending_items) exceeds the threshold, and for removing a proper number of entries from the BMT cache 121 when it does. A corresponding control algorithm for the total pending entry count can be handled by the BMT commit manager 130.

The A_BMT_E data structure will now be described with respect to the main algorithms and functions.

The data structure of A_BMT_E is as shown in Table 1.

TABLE 1

```
#define ABMTE_PENDING 1
#define ABMTE_NONPENDING 0
struct A_BMT_E{
    sector_t lbno;
    sector_t pbno;
    int run_length; //max = 4k/4(size of(BMT)) = 1024
    struct list_head ppq_abmte;
    unsigned short pending; // 1 : pending A_BMT_E, 0 :
        non_pending A_BMT_E
};
```

In Table 1, sector_t lbno is the logical block number associated with an BMT update entry, sector_t pbno is the physical block number associated with the entry, int run_length is the length of the entry in number of consecutive blocks, struct list_head ppq_abmte is a pointer to the next BMT entry in the same per-page queue, and unsigned short pending defines whether a BMT entry is a pending entry or a non-pending entry.

The purpose of a per page queue BMT update function (e.g. PPQ_BMT_update) is to insert one single aggregated BMT entry into a per page queue BMT cache (e.g. ppq.bmt_cache). To insert an aggregated BMT entry into the BMT cache 121 by traversing from the head of the BMT cache list, the following factors need to be taken into consideration: whether the new entry needs to be merged to existing entries, triggers a split of existing entries, or is an independent entry. The non-pending count and pending count need to be adjusted for the BMT cache 121 as well.

FIGS. 3-10 illustrate the various categories for inserting a new BMT entry.

FIGS. 3-6 illustrate examples where a LBN of a new entry is less than a LBN of an existing entry. That is, FIGS. 3-6 illustrate examples where the LBN of the new entry is less than the LBN of the existing entry (i.e. new.lbno<existing.lbno).

FIG. 3 illustrates the case where a new entry is added in front of an existing entry. This occurs when the LBN plus the length of the new entry is less than or equal to the LBN of the existing entry (i.e. new.lbno+new.run_len<=existing.lbno). The new entry is placed before the existing entry.

FIG. 4(*a*) illustrates the case where a new entry and an existing entry have the same end point. That is, in FIG. 4(*a*), the LBN of the new entry plus the length of the new entry is equal to the LBN of the existing entry plus the length of the existing entry (i.e. new.lbno+new.run_len=existing.lbno+existing.run_len). When this situation occurs three solutions are possible depending on whether the entries are pending or non-pending. If the new entry is a pending entry, the new entry can overwrite the existing entry. If both of the new entry and the existing entry are non-pending entries, the new entry can overwrite the existing entry. If the new entry is pending and the existing entry is non-pending, the new entry should not overwrite the existing entry. The latter of the cases, when a new entry does not overwrite an existing entry, is illustrated in FIG. 4(*b*).

Figure 5:
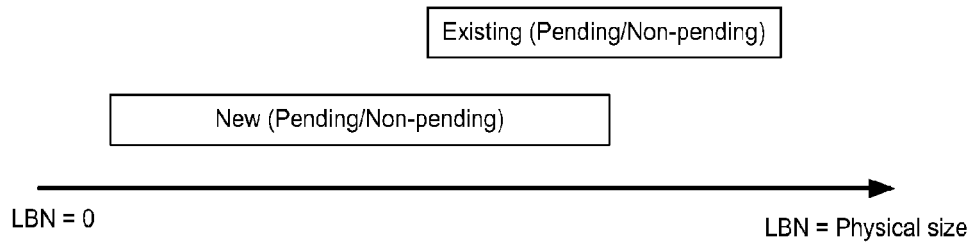

FIG. 5 illustrates the case where a new entry has an end point that is less than the end point of an existing entry. That is, in FIG. 5, the LBN of the new entry plus the length of the new entry is less than the LBN of the existing entry plus the length of the existing entry (i.e. new.lbno+new.run_len<existing.lbno+existing.run_len). In this example, LFSM splits the new entry into two parts and decides if the lower half of the new entry can overwrite the existing entry based on the pending/non-pending nature of the entries as discussed above.

Figure 6:
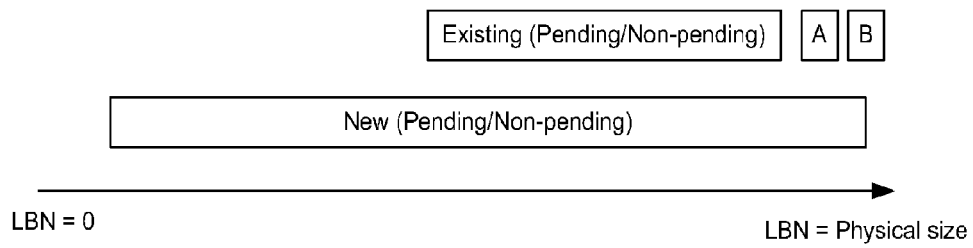

FIG. 6 illustrates the case where a new entry has an end point that is greater than the end point of an existing entry. That is, in FIG. 6, the LBN of the new entry plus the length of the new entry is greater than the LBN of the existing entry plus the length of the existing entry (i.e. new.lbno+new.run_len>existing.lbno+existing.run_len). A split or a merge of the new entry needs to be considered.

Figure 7:
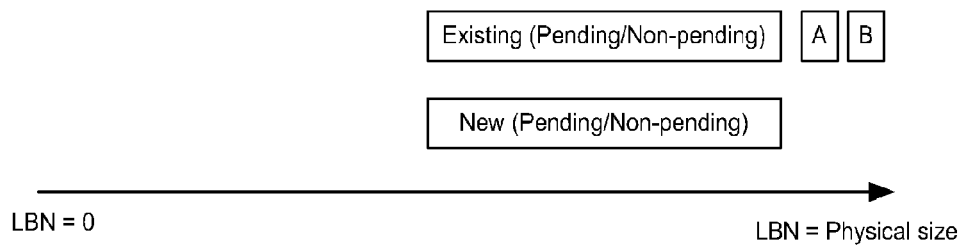

FIGS. 7-9 illustrate examples where a LBN of a new entry is less than or equal to a LBN of an existing entry and the LBN of the new entry is less than or equal to the LBN of an existing entry plus the length of the existing entry minus 1 (i.e. new.lbno>=existing.lbno && new.lbno<=existing.lbno+existing.run_len−1).

FIG. 7 illustrates the case where a LBN of a new entry is equal to a LBN of an existing entry and the length of the new entry is equal to the length of the existing entry (i.e. new.lbno=existing.lbno && new.run_len=existing.run_len).

FIGS. 8(*a*)-8(*b*) illustrate the cases where a LBN of a new entry plus the length of the new entry is less than or equal to a LBN of an existing entry plus the length of the existing entry (i.e. new.lbno+new.run_len<=existing.lbno+existing.run_len). FIG. 8(*a*) illustrates the case where there is head alignment between the new entry and the existing entry (i.e. new.lbno=existing.lbno). FIG. 8(*b*) illustrates the case where there is tail alignment between the new entry and the existing entry (i.e. newnew.lbno+new.run_len=existing.lbno+existing.runlen). FIG. 8(*a*) illustrates the case where there is neither head alignment nor tail alignment between the new entry and the existing entry (i.e. the new entry is located in the middle of the existing entry).

FIGS. 9(*a*)-9(*b*) illustrate cases where a LBN of a new entry plus the length of the new entry is greater than a LBN of an existing entry plus the length of the existing entry (i.e. new.lbno+new.run_len>existing.lbno+existing.run_len). FIG. 9(*a*) illustrates the case where there is no tail alignment. FIG. 9(*b*) illustrates the case where there is tail alignment.

FIG. 10 illustrates the case where a LBN of a new entry is greater than a LBN of an existing entry plus the length of the existing entry minus 1 (i.e. new.lbno>existing.lbno+existing.run_len−1).

Figure 11:
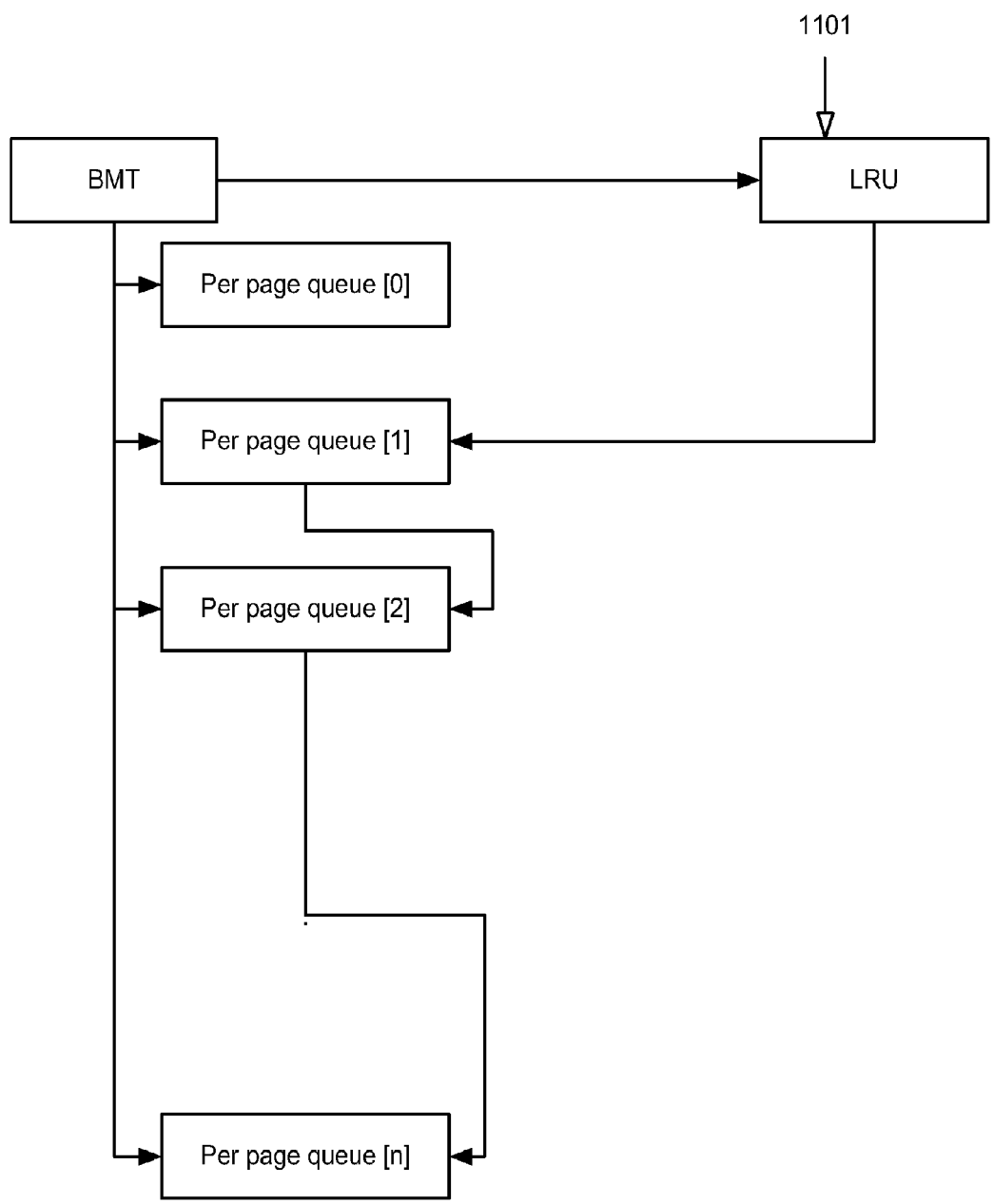
FIG. 11 illustrates a Least Recently Used (LRU) list utilized in the BMT caching process to evict the entries from the BMT Cache.

FIG. 11 illustrates a Least Recently Used (LRU) list utilized in the BMT caching process. The BMT cache 121 also utilizes a Least Recently Used (LRU) list 1101. When the BMT cache 121 is full (i.e. the total number of the non-pending entries in the cache reaches the PPQ_CACHE_T_HIGH threshold) some of the non-pending entries need to be removed from the BMT cache 121. To remove the BMT cache entries in LRU order, the per-page BMT update queues are organized into a LRU list. BMT cache entries are evicted according to this LRU list 1101. Only those per-page queues with non-pending BMT cache entries are added into the LRU list 1101.

It is not sufficient to only evict the smallest number of entries so as to keep the total number of non-pending entries in the BMT cache less than the PPQ_CACHE_T_HIGH, because the cache may become full in a short period of time and triggers an additional round of eviction. To address this problem, another threshold (i.e. PPQ_CACHE_T_LOW) is used. When a cache full condition arises, a number of entries greater than or equal to PPQ_CACHE_T_HIGH-PPQ_CACHE_T_LOW are evicted in order to keep the total pending entries less than PPQ_CACHE_T_LOW. PPQ_CACHE_T_HIGH and PPQ_CACHE_T_LOW are set by default to 10K and 8K, but can be modified, as system needs require and resources allow.

The BMT Commit Manager (BCM) 130 commits in-memory pending BMT updates to the on-disk BMT 122. This process is also referred to as BMT commit or simply commit. BMT commit is always performed in the background thread in a BMT commit manager function (e.g. BMT_commit manager). Batching Updates with Sequential Commit (BUSC) is used in the BCM 130. Specifically, BUSC batches updates to basic units of an on-disk data structure, and commits these updates to each of these units in an order that is tailored to the need of the data structure in question.

Commit and BMT update logging are highly inter-dependent. At any given point in time, the pending BMT updates that are not yet committed should exist securely in the BMT update log 123 as well as per-page BMT update queues. Even if the system crashes before the pending updates are committed to the disk, this "backup information" from the BMT update log 123 can be used to recover these pending BMT updates. Crash recovery will be described in greater detail below.

Since BCM implementation is interleaved with that of BMT update logging, BMT update logging will now be described. BMT update log 123 is treated as a circular log of EUs where new writing operations are against its head EU. Once the head EU reaches the end of the update log, it wraps around. After committing the pending BMT entries in the tail EU of the BMT update log 123, LFSM 100 moves the tail pointer 202 ahead to reclaim the old tail EU. After every commit, the sectors in the update log holding the committed updates are freed i.e. can be re-used. The design goal of BMT update logging is to keep as much free space as possible available in the update log, minimize the number of commits, and to make sure that the tail EU of the BMT update log 123 is not overrun by the head EU. Based on the aforementioned constraints, there are two types of commit deployed by the BCM: popularity-based and critical.

For each BMT EU, LFSM maintains a data structure that records all the pending updates to BMT entries in that BMT EU. This data structure is referred to as a dependency list, is implemented as an array of per-page update queues, and is released after updates to the corresponding BMT EU are omitted. Similarly, every BMT update log EU maintains information about the set of BMT EUs that have pending updates residing on the BMT update log EU. These dependency lists are contained in a per-page BMT update log queue array. This list is populated during a BMT update logging operation (e.g. BMT_update_log) and is shrinked when pending updates to a BMT EU are committed.

Popularity of a BMT EU is defined as the number of pending BMT updates whose target BMT entries fall into that BMT EU. The BMT EU that has the maximum number of pending updates is called the most popular BMT EU. An array used to maintain this popularity information is the BMT EU update log per page queue array (e.g. bmt_eu_2_ul_popularity). The BCM 130 starts operating after at least 25% of the BMT update log 123 is full. At this point, popularity-based commit happens, i.e. pending updates of the most popular BMT EU will be committed so as to free a maximum number of sectors from the BMT update log. The desired EU is brought into memory from the on-disk BMT 103 using a read BMT page function (e.g. read_bmt_page), its content is modified by committing this BMT EU's pending updates using a per page queue BMT commit build page buffer function (e.g. PPQ_BMT_commit_build_page_buffer) and written back using a BMT write page function (e.g. write_bmt_page).

Though popularity-based commit frees as many sectors as possible, popularity based commit will not guarantee the advancement of the tail pointer 202 of the BMT update log 123. Without advancing the tail pointer of the BMT update log 123, no space from the BMT update log 123 can be freed and reclaimed. Critical commit occurs when the free space in the BMT update log is below a certain threshold. In this situation, the BCM commits all the pending BMT update entries in the tail EU of the BMT update log 123, and thus directly frees the tail EU of BMT update log 123. Consequently, this would move the tail pointer 202 of BMT update log 123 by at least one EU so that the head pointer of the update log can advance for at least one more EU.

After a commit of a BMT EU, a check is made to determine if the tail pointer 202 of the BMT update log 123 can be moved further. This is beneficial in the cases where the popularity based commit alone might be good enough to move the tail pointer.

The purpose of crash recovery is to reconstruct the system status after a crash when a loss of memory data occurs. To this end, the most important information of LFSM 100 stored in the memory is the pending BMT entries in the BMT cache 121. Thus, the crash recovery module is responsible for reconstructing these BMT entries from the BMT update log 123 after a system crash.

LFSM 100 detects a crash by examining the signature sector during system initialization (e.g. generate_freemap_frontier). A signature sector equal to the LFSM load (e.g. LFSM_LOAD) means LFSM 100 was previously loaded and was not unloaded successfully. Thus, a BMT crash recovery function (e.g. BMT_crash_recovery) is called to perform the crash recovery.

BMT_crash_recovery is a main function for the LFSM crash recovery module. BMT_crash_recovery reads out all of the data in the BMT update log 123 whose address is equal to the BMT update log start position (e.g. BMT_update_log_start). The pending BMT entries are obtained by parsing the data of BMT update log 123. Finally, a per page queue BMT cache insertion function (e.g. PPQ_BMT_cache_insert_one_pending) is called to insert the discovered pending BMT entries to the BMT cache 121. LFSM 100 completes the reconstructing procedure by calling an update on disk BMT function (e.g. update_ondisk_BMT) to commit all of the BMT entries in the BMT cache 121 to the on-disk BMT 122.

Generally, crash recovery reconstructs the pending BMT entries from the BMT update log 123 and commits them to the on-disk BMT 103. Because the BMT update log 123 is a circular buffer, which guarantees that no data will be overwritten and that all of the pending BMT entries are recorded in the BMT update log 123, the pending BMT update entries can be successfully reconstructed from a crash.

When the LFSM driver is properly unloaded and re-loaded, LFSM 100 can construct all of its data structures at the initialization time. Also, through a signature sector, the LFSM driver can determines whether the connected flash disk is a fresh disk or a previously used disk before building up the head and tail pointers for the BMT update log and other data structures. Generally, the signature sector has the fields "char signature".

The signature is a predefined ASCII value, which determines if the connected disk is a fresh disk or a used disk, and also helps to identify if crash recovery needs to be performed. When the LFSM driver is loaded, the signature field is assigned as LFSM loaded (e.g. LFSM_LOAD), and will be assigned to LFSM unloaded (e.g. LFSM_UNLOAD) after the LFSM is successfully unloaded, or if the LFSM is a fresh one and never been initialized before.

A successful unload signature value (e.g. signature_successful_unload) is also a predefined ASCII value which is used to decide whether the recovery algorithm needs to be performed. If the driver is properly unloaded, there is no need to perform recovery; else recovery should be performed. As described above, in order to convert random writes to sequential writes LFSM 100 requires three I/O operations for each write request. This produces a race condition in which multiple write requests target at the same LBA and the most recent one is scheduled after other write requests. To solve this problem, LFSM 100 uses an active list to ensure that any possible conflicting I/O requests are processed according to their incoming order.

All of the processing of the I/O requests are stored in an LFSM active list (e.g. lfsm_dev_struct.datalog_active_list). Each I/O request in the active list is described by a bio container (e.g. bio_container) data structure. The insertion of the active list is handled by a get bio container function (e.g. get_bio_container). Before processing a new incoming I/O request, the get bio container function checks if the I/O request conflicts with any items in the active list by traversing the active list (e.g. datalog_active_list). If the I/O request does not conflict with any request in the active list, a new bio container is initialized and added to the active list and processing is started. If an I/O request S does conflict with some request R in the active list, the bio container of S will be appended to the wait list (e.g. wait_list) of the bio container associated with R, and the thread handling S will be added in an I/O queue (e.g. io_queue) and its status will be changed to pending.

After an I/O request in the active list is finished, the entries in its wait list are examined to identify those that are ready to be put into the active list, which is done in the move from active to free function (e.g. move_from_active_to_free). The thread of a conflicting I/O request in the wait list will be woken up if all of the conflicts are removed, that is, the number of conflicts with the active list is reduced to 0.

In the processing of a write request, the LFSM 100 always logs the writes sequentially. This sequential nature is with respect to one EU (i.e. inside one EU, the writes are kept sequential). Though many logical blocks get overwritten over time, they cannot immediately be over-written, since immediate over-writing would break the sequential write property of LFSM 100. Instead, sequentially logging is continued, using the free blocks and marking the old over-written blocks as invalid. Thus, over time, the number of invalid blocks increases and proportionally the number of free blocks decreases. Hence, to clean up the invalid blocks and make them re-usable (free), Garbage Collection (GC) is performed. The goal of GC is to reclaim invalid physical blocks as quickly as possible while reducing the performance overhead associated with reclamation to the minimum. GC in LFSM 100 is always done in the background thread in a collect valid blocks function (e.g. gc_collect_valid_blks).

Garbage collection according to the present invention is EU-based. In other words, valid blocks of one EU are completely moved to another EU and this EU is then erased and moved to the free pool. The same process is then performed on another EU. A threshold ratio (i.e. the number of free EUs to the total number of EUs) is used to trigger the GC. Generally, a good ratio is 20% and is represented by a garbage collection threshold (e.g. GC_THRESHOLD_FACTOR), although other ratios are acceptable. When the threshold ratio is reached, GC starts in the background. Due to various reasons like scheduling, heavy I/O in a main thread, etc., there might be a case where the background GC might not be able to process EUs fast enough to provide enough EUs in the free pool, and hence the main thread might not find any free EU to process its write requests. In this scenario, the main thread yields to the background thread (i.e. to perform GC), and waits until the main thread finds at least one free EU in the free pool. This is referred to as critical garbage collection.

An ideal GC algorithm possesses the following properties:
1. Minimizes the number of valid pages copied during garbage collection; and
2. Refrains from garbage-collecting an EU when its number of valid blocks is still dropping.

LFSM 100 satisfies the above-mentioned criteria in a novel way.

Figure 12:
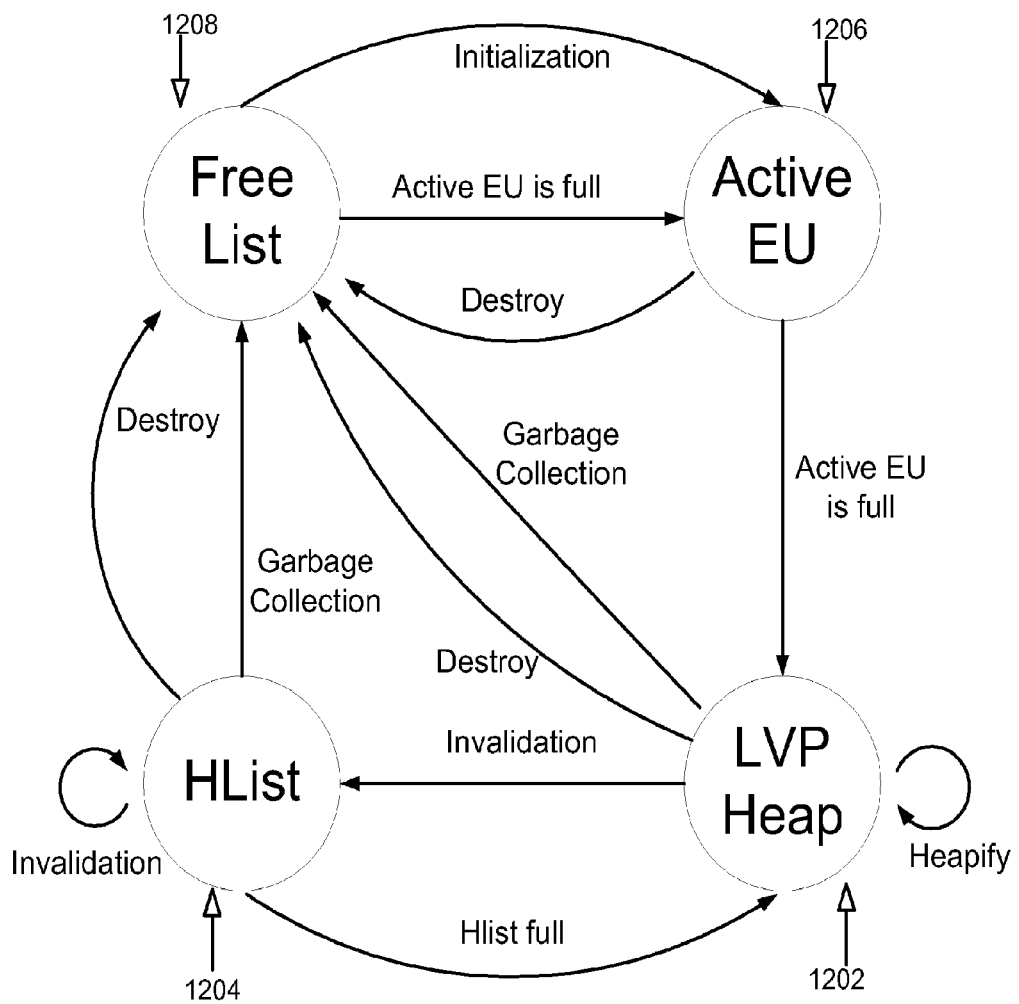
FIG. 12 is a flow diagram illustrating the life cycle of an EU based on utilization.

FIG. 12 is a flow diagram illustrating the life cycle of an EU based on its utilization ratio, which is the percentage of blocks in an EU that are still valid or live. When garbage-collecting an EU, all the valid pages in the EU are copied to another free EU, and the old EU is then erased and moved to the free pool. Therefore, the best EU candidate for being garbage-collected is an EU whose utilization ratio is the smallest. The data structure that is most efficient to keep track the utilization ratios of EUs is a minimum heap (e.g. Min-Heap), which is referred to as LVP Heap 1202, wherein the root corresponds to the EU with the least number of valid pages. In log N time, a EU can be inserted and deleted from this heap. An important insight here is not to garbage-collect an EU whose, utilization ratio is still decreasing, because this would have resulted in copying pages that are likely to get invalidated soon. To identify those EUs whose utilization ratio stabilizes, LFSM uses a LRU list called Hlist 1204. Whenever a block in an EU gets invalidated (i.e., its corresponding logical block gets over-written), this EU is moved to the head of the Hlist 1204. An EU continues to stay in HList 1204 until it reaches the tail of the HList 1204, at which time the EU is moved to the LVP heap. The idea of Hlist is that if an EU's utilization ratio does not drop during the period of time in which it stays in the Hlist until it is evicted, then this EU's utilization ratio should stabilize. The size of Hlist 1204 plays an important role in the effectiveness of the above heuristic, and is represented by a Hlist capacity (e.g. HLIST_CAPACITY), which can be determined experimentally. A possible value for HLIST_CAPACITY is 100.

The information regarding HList 1204 and LVP heap 1202 are stored in a Hlist garbage collection structure (e.g. HlistGC), and the information regarding the utilization ratio and temperature of every EU are stored in its respective EU property structure (e.g. EUProperty).

Since the garbage collection thread and the main thread writes run concurrently, there might be a possibility of conflicts i.e. both targeting the same LBN. For example, during a GC write it might be determined that the LBN being targeted is already in the Active List 1206. This means that the particular EU having this LBN is in the process of being invalidated and will soon be moved to HList 1204 and should not be garbage collected. Hence, the garbage collection of this EU should be aborted.

As explained earlier, the main goal of GC is to reclaim invalidated EUs as quickly as possible while minimizing its associated performance overhead. To accomplish this, EUs are selected from the LVP heap 1202, one after another, until it is determined that garbage collection of these EUs would provide one EU worth free space. If it is determined that EUs in the LVP heap 1202 are insufficient to satisfy these constraints, a EU is selected from Hlist 1204, and GC proceeds on this list of EUs one EU at a time starting from the selected EU.

The information regarding the LBN of all the blocks in the EU is kept in a sector referred to as a metadata sector. This sector resides in the last block (e.g. 8 sectors) of the EU. The metadata sector is read to determine which LBNs are present and also how many of those LBNs are still valid using an EU bitmap. After making this determination, bio containers are allocated to copy these valid blocks. If conflicts with the main thread write are detected, the GC of that EU is stopped and GC would proceed with the next EU. Then, the entire EU is read, and after having read the content of the EU into memory, the EU is moved to Free List 1208 from the LVP Heap 1202/Hlist 1204 depending on the present location of the EU. Then, a new PBN is assigned to these blocks based on their new location. The read content is copied before it is written to the allocated containers. The writes are executed one block after another. After this process is completed, the containers are released and the data structures are promptly freed. This process is repeated for all the EUs in the list.

Figure 13:
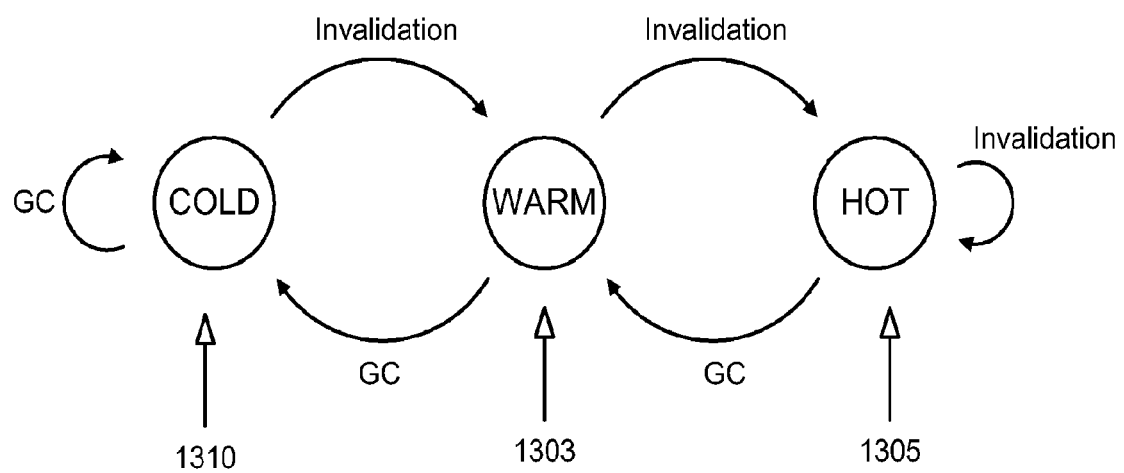
FIG. 13 is a flow diagram illustrating the life cycle of a block based on temperature.

FIG. 13 is a flow diagram illustrating the life cycle of a logical block based on temperature. A logical block's temperature denotes the frequency of it being overwritten. Logical blocks that are frequently over-written are assigned as HOT 1305, those that are relatively stable are assigned as WARM 1303, and those that are almost never over-written are assigned as COLD 1301. For example, Dynamic Link Library (DLL) files could be termed COLD 1301, while temporary (TEMP) files are treated as HOT 1305. The idea of allocating a physical block for a logical block is to group logical blocks with similar temperature into the same EU. The assumption is that blocks having the same temperature generally die (are invalidated) together. If so, by the time an EU is chosen for garbage collection, most of the blocks in that EU are already dead and the utilization ratio is small. When a logical block is written for the first time, by default the block is assigned to a cold 1301 EU. Once the block is over-written, that block is assigned to a warm 1303 EU. If the block is again over-written, the block is moved to a hot 1305 EU and remains there for all subsequent overwrites. Similarly, if a hot logical block 1305 survives (remains valid in the EU) a GC-induced copy operation, the block is moved to a warm 1303 EU. If the block survives another GC-induced copy operation, the block is moved to a cold 1301 EU and remains there for all further GC-induced copy operations.

Figure 14:
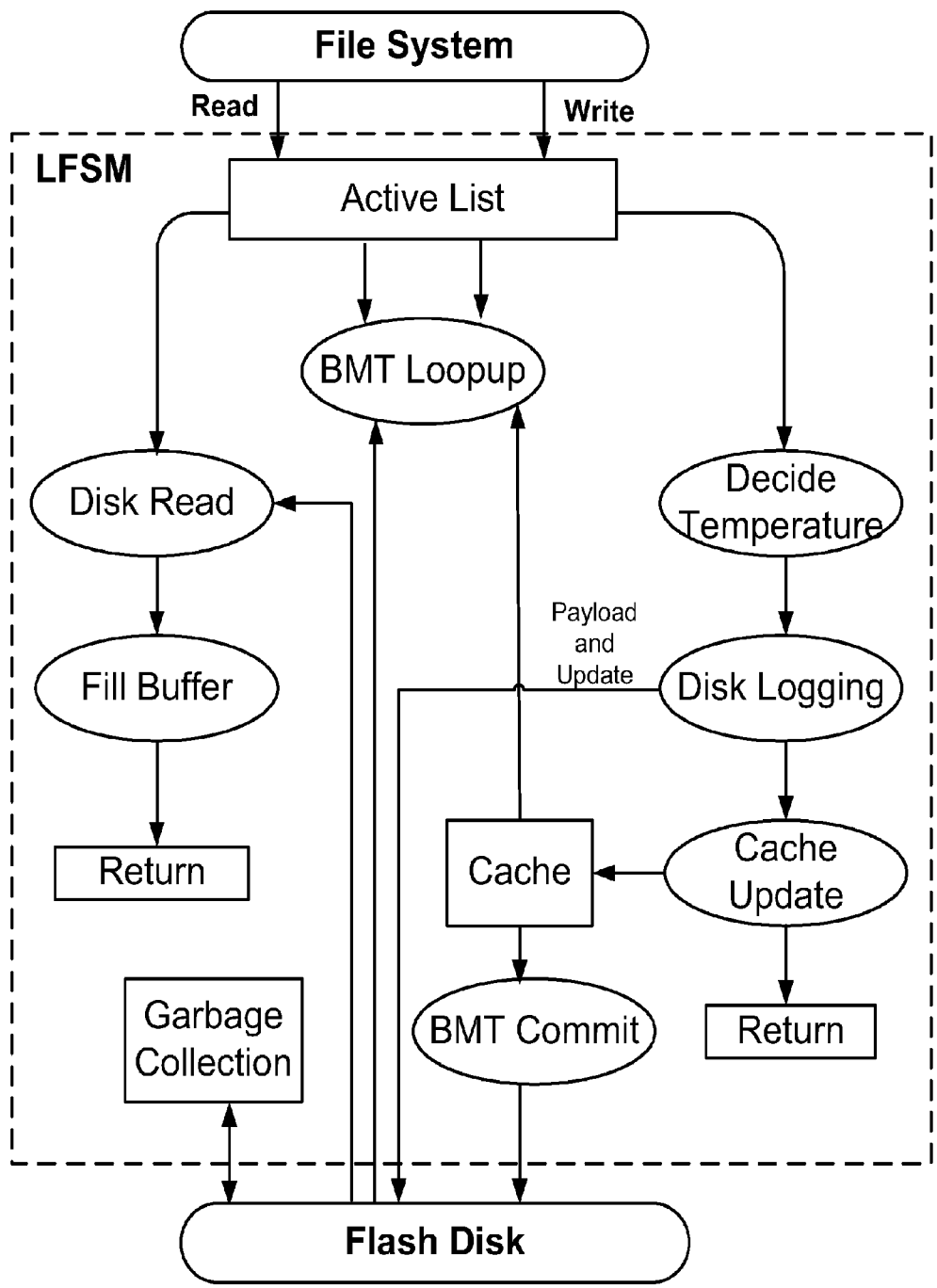
FIG. 14 is a flow diagram illustrating the LFSM method according to the present invention.

FIG. 14 is a flow diagram illustrating the LFSM method according to the present invention. A write requested at the active list generates a BMT lookup. When a BMT lookup occurs, a temperature is determined and disk logging takes place based on the temperature. The cache is also updated in the BMT cache. A BMT commit occurs to the flask disk upon reaching the required conditions. A read request triggers a BMT lookup and in turn triggers a flash disk read. Garbage collection from the flash disk is performed on a regular basis as required.

There are three main data structures in LFSM: the BMT, the payload EUs that hold the user data, and the BMT update log. Because these three data structures can be spread anywhere on the disk, the BMT needs to describe the payload EUs, the BMT map to describe the BMT, and the update log map to describe the BMT update log. The BMT update log is organized as a linked list of EUs, e.g. the last sector of an EU points to the EU following it, etc. Therefore, only the physical address of the first EU of the BMT update log needs to be remembered in order to locate the BMT update log. Every time the first EU of the BMT update log changes, this EU's physical address is logged to a special data structure called the dedicated map.

The BMT map is modified whenever the background BMT update commit thread brings in a BMT EU, commits all the EU's pending updates to the EU, and writes the resulting EU to a free EU on disk. At this point, the background thread should log a BMT map update to the BMT update log, and retire the associated BMT update entries in the BMT update log. To retire BMT map update entries in the BMT update log, LFSM checkpoints the entire BMT map, which is sufficiently small to be memory-resident, to the dedicated map from time to time.

The dedicated map region of 2+N EUs, where the first two EUs reside in a fixed disk location and the other N EUs are from the standard EU pool (thus participating in wear leveling) and are organized as a linked list. The only responsibility of the first two EUs is to maintain a pointer to the remaining N EUs. The checkpoints of the BMT map and the address of the first EU of the update log are both stored in these N EUs, with proper timestamps. Note that the first two EUs in the dedicated map do not participate in wear leveling and are the only data structure that is in a fixed place.

During recovery, LFSM traverses through the first two EUs in the dedicated map, because they are in a fixed location, to locate the most recent pointer to the remaining N EUs in the dedicated map. Then LFSM traverses through these N EUs to find the base address of the first EU of the BMT update log, and the latest checkpoint of the BMT map. Then by scanning the BMT update log, LFSM can reconstruct the most up-to-date version of the BMT map before the crash, and eventually the BMT. By scanning the BMT update log again, LFSM can reconstruct the pending BMT update entries in the per-page BMT update queues in memory.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for managing logical block write requests for a flash drive, comprising the steps of:
   receiving a logical block write request from a file system;
   assigning a category to a logical block; and
   generating at least three writes from the logical block write request, a first write writes the logical block to an Erasure Unit (EU) according to the category assigned to the logical block, a second write inserts a Block Mapping Table (BMT) update entry to a BMT update log, and a third write commits the BMT update entry to an on-disk BMT,
   wherein the first and second writes are performed synchronously and the third write is performed asynchronously and in a batched fashion.

2. The method of claim 1, wherein the category is based on an amount of activity associated with the logical block.

3. The method of claim 2, wherein when the amount of activity associated with the logical block in the EU is less than a predetermined threshold, the EU is written to the on-disk BMT.

4. The method of claim 2, wherein the category is one of hot, warm or cold, and as the activity associated with a logical block increases, the category assigned to the logical block changes from cold to warm to hot.

5. The method of claim 1, further comprising writing logical blocks contained in the EU to the flash drive when an amount of data stored in the EU reaches a threshold.

6. The method of claim 1, wherein the second write to the BMT update log is preformed in a consecutive and circular manner, the BMT update log having a tail pointer and a head pointer, the tail pointer indicating a logical block that has not been written to the on-disk BMT that has been in the BMT update log for a longest period of time, and the head pointer indicating a logical block that has not been written to the on-disk BMT that has been in the BMT update log for a shortest period of time.

7. The method of claim 6, further comprising committing pending BMT updates to the on-disk BMT in a batched manner such that a total overhead of propagating these BMT updates to disk is reduced in order to reclaim free space on the BMT update log so that processing of write requests can proceed.

8. The method of claim 6, further comprising writing logical blocks contained in the EU to the flash drive when the BMT update log reaches a threshold.

9. The method of claim 1, wherein entries in the BMT update log having consecutive logical block numbers and consecutive physical block numbers are aggregated into a single entry.

10. The method of claim 9, wherein the single entry identifies a lowest logical block number of the entries that have been aggregated, a lowest physical block number of the entries that have been aggregated, and a number of blocks being aggregated.

11. The method of claim 1, further comprising reclaiming EUs on the flash drive, comprising:
  detecting whether a utilization ratio of an EU is stable; and
  reclaiming EUs with a stabilized utilization ratio in an order according to the utilization ratio.

12. A method for interval-based Block Mapping Table (BMT) caching, comprising:
  aggregating into a single entry entries in a BMT update log having consecutive logical block numbers and consecutive physical block numbers.

13. The method of claim 12, wherein the single entry identifies a lowest logical block number of the entries that have been aggregated, a lowest physical block number of the entries that have been aggregated, and a number of blocks being aggregated.

14. A method for reclaiming Erasure Units (EUs) on a flash disk, the method comprising the steps of:
  detecting whether a utilization ratio of an EU is stable; and
  reclaiming EUs with a stabilized utilization ratio in an order according to their utilization ratio.

15. An apparatus for managing read and write requests for a flash drive, comprising:
  a Log-structured Flash Storage Manager (LFSM), for receiving a logical block write request for a logical block from a file system for the flash drive, comprising:
    a logging module for assigning a category to the logical block;
    a Block Mapping Table (BMT) for temporarily storing the logical block; and
    a BMT commit manager for controlling writing of logical blocks from the BMT to the flash drive, wherein the logging unit, the BMT and the BMT commit manager are comprised within a non-transitory computer readable storage medium.

* * * * *